United States Patent Office 3,051,717
Patented Aug. 28, 1962

3,051,717
DIHYDRODIOXONAPHTHYLENEDITHIOBIS
(THIAZOLECARBOXYLATES)
John J. D'Amico, Charleston, W. Va., assignor to Monsanto Chemical Company, St. Louis, Mo., a corporation of Delaware
No Drawing. Filed Nov. 29, 1960, Ser. No. 72,276
8 Claims. (Cl. 260—302)

The present invention relates to new compositions of matter. More particularly it relates to 2,2'-(1,4-dihydro - 1,4, - dioxo-2,3-naphthylenedithio)bis(4-thiazolecarboxylates) and derivatives.

The compounds of this invention possess the structure

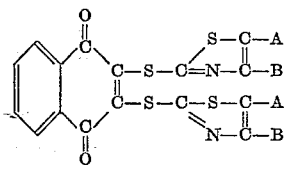

wherein one of A and B is hydrogen or lower alkyl and the other is carboxyl, lower carboalkoxy, lower alkyl carbonyl, carbamoyl or phenyl carbamoyl. These compounds may be prepared by reacting the appropriate mercaptothiazolecarboxylic acid or derivative, conveniently in aqueous alkaline solution, with 2,3-dichloro1,4-naphthoquinone. For the purpose of describing the invention and not as limitative thereof, the following examples are given:

EXAMPLE 1

To a stirred solution containing 0.2 mole of ethyl 2-mercapto-4-thiazolecarboxylate, 13.2 grams (0.2 mole) of 85% potassium hydroxide and 400 ml. of acetone was added in one portion 23.7 grams (0.1 mole) of 2,3-dichloro-1,4-naphthoquinone. The stirred solution was heated at 50–56° C. for 4 hours and then added to 1500 grams of ice-water. After stirring for 15 minutes, the solid was collected by filtration, washed with water until the washings were neutral to litmus and air dried at 25–30° C. The diethyl 2,2'-(1,4-dihydro-1,4-diox-2,3-naphthylenedithio)bis(4-thiazolecarboxylate) was obtained as a brown solid in 80% yield. After recrystallization from benzene it melted at 195–197° C. Analysis gave 5.4% nitrogen and 24.1% sulfur as compared to 5.3% nitrogen and 24.1% sulfur calculated for $C_{22}H_{16}N_2O_6S_4$. Other esters, as for example the methyl, propyl, isopropyl, butyl and amyl esters are obtained by similar procedure from the mercapto thiazolecarboxylate. Formation of the free acid takes place, although in lower yield, by substitution of 0.2 mole of 2-mercapto-4-thiazolecarboxylic acid for the ethyl ester in this procedure.

Employing the procedure of Example 1 but replacing ethyl 2-mercapto-4-thiazolecarboxylate with an equimolecular proportion of 2-mercapto-4-methyl-5-thiazolecarboxamide, 2,2'-(1,4-dihydro-1,4-dioxo-2,3-napthylenedithio)bis(4-methyl-5-thiazolecarboxamide) was obtained in 95.5% yield as an orange solid melting at 171–173° C.

EXAMPLE 2

In the procedure of Example 1, 50 grams (0.2 mole) of 2-mercapto-4-methyl-5-thiazolecarboxanilide was substituted for the ethyl 2-mercapto-4-thiazolecarboxylate. The 2,2'-(1,4-dihydro-1,4-dioxo-2,3-naphthylenedithio)bis(4-methyl-5-thiazolecarboxanilide) obtained in 98% yield was a brown solid melting at 202–204° C. Analysis gave 8.2% nitrogen and 19.5% sulfur compared to 8.6% nitrogen and 19.6% sulfur calculated for $C_{32}H_{22}N_4O_4S_4$.

EXAMPLE 3

In the procedure of Example 1, 34.7 grams (0.2 mole) of 2-mercapto-4-methyl-5-thiazolemethyl ketone was substituted for the ethyl 2-mercapto-4-thiazolecarboxylate. The 2,2'-(1,4-dihydro-1,4-dioxo-2,3-naphthylenedithio)bis(4-methyl-5-thiazolemethyl ketone) obtained in 72% yield was a brown solid melting at 132–134° C.

EXAMPLE 4

To a stirred solution containing 34.8 grams (0.2 mole) of ethyl 2-mercapto-4-methyl-5-thiazolecarboxylate, 12.6 grams (0.2 mole) of 90% potassium hydroxide, 400 ml. of acetone and 10 ml. of water was added in one portion 23.7 grams (0.1 mole) of 2,3-dichloro-1,4-naphthoquinone. The stirred reaction mixture was heated at 25–30° C. for 4 hours and then added to 1500 grams of ice-water. After stirring for 15 minutes at 10–20° C., the product was isolated as described in Example 1. Diethyl 2,2'-(1-4-dihydro-1,4-dioxo-2,3-naphthylenedithio)bis(4-methyl - 5 - thiazolecarboxylate) was obtained in 89% yield as a brown solid melting at 116–118° C. Analysis gave 4.7% nitrogen and 22.9% sulfur compared to 5.0% nitrogen and 22.9% sulfur calculated for $C_{24}H_{20}N_2O_6S_4$.

The various functional groups present render the compounds of this invention obviously useful as intermediates. Also, they possess useful biological activity. At a concentration of 0.001% diethyl 2,2'-(1,4-dihydro-1,4-dioxo-2,3 - naphthylenedithio)bis(4-thiazolecarboxylate) prevented growth of Micrococcus pyogenes var. aureus and of Aspergillus niger. It proved toxic to fungi which property was retained in the presence of soil. The fungi present in the soil were "damping off" fungi, principally Pythium, Rhizoctonia and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots and 5 seeds of each 4 crop plants sown in each pot. The crop plants were Black Valentine beans, Delta Pine cotton, Straight Eight cucumber and Laxton's Progress peas. The seeded pots were then incubated at 70 F. at 98% humidity to insure activity of the organisms in the soil. 24 hours later, the pots were removed to a greenhouse and disease assessments made within 10–14 days. The percent emergence and disease incidence was recorded. Eleven or less healthy plants out of twenty indicated no activity whatsoever. With soil treated with 200 parts per million of diethyl 2,2'-(1,4-dihydro-1,4,dioxo 2,3-naphthylenedithio)bis(4-thiazolecarboxylate) there were more than sixteen healthy plants from the twenty seeds planted. 2,2'-(1,4-dihydro-1,4-dioxo-2,3-naphthylenedithio)bis(4-methyl-5-thiazolecarboxanilide) and 2,2'-(1,4-dihydro-1,4-dioxo-2,3-naphthylenedithio)bis(4-methyl - 5-thiazole methyl ketone) were effective at 100 parts per million against Pythium and Rhizoctonia.

The new compounds of this invention accelerate vulcanization of rubber. To a base composition comprising

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 | there were added antioxidant and 0.5 part by weight Stock A—Diethyl 2,2'-(1,4-dihydro-1,4-dioxo-2,3-naphthylenedithio)bis(4-thiazolecarboxylate)

Stock B—2,2'-(1,4-dihydro-1,4-dioxo-2,3-naphthylene-dithio)bis(4-methyl-5-thiazolecarboxanilide)
Stock C—Diethyl 2,2'-(1,4-dihydro-1,4-dioxo-2,3-naphthylenedithio)bis(4-methyl-5-thiazolecarboxylate)
Stock D—2,2'-(1,4-dihydro-1,4-dioxo-2,3-naphthylene-dithio)bis(4-methyl-5-thiazolemethyl ketone)
Stock E—2,2'-(1,4-dihydro-1,4-dioxo-2,3-naphthylene-dithio)bis(4-methyl-5-thiazolecarboxamide)

The stocks were then vulcanized for 60 minutes at 144° C. in the usual manner. The physical properties of the vulcanizates are set forth below:

*Table I*

| Stock | Modulus of Elasticity in lbs./in.$^2$ at Elongation of 300% | Tensile at Break in lbs./in.$^2$ | Ultimate Elongation, Percent |
|---|---|---|---|
| A | 920 | 1,860 | 500 |
| B | 1,190 | 2,140 | 450 |
| C | 1,350 | 2,810 | 500 |
| D | 1,230 | 2,270 | 470 |
| E | 1,150 | 2,000 | 470 |

It is intended to cover all changes and modifications of the examples of the invention herein chosen for purposes of disclosure which do not constitute departures from the spirit and scope of the invention.

This application is a continuation-in-part of copending application Serial No. 854,590, filed November 23, 1959, now abandoned.

What is claimed is:
1. A compound of the formula

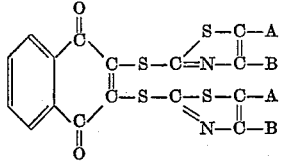

wherein one of A and B is selected from the group consisting of carboxyl, lower carboalkoxy, lower alkyl carbonyl, carbamoyl and phenylcarbamoyl and the other is selected from the group consisting of hydrogen and lower alkyl.

2. A compound of the formula

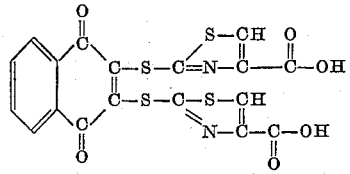

3. A compound of the formula

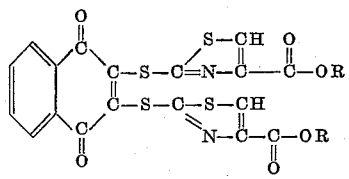

where R is lower alkyl.

4. Diethyl 2,2'-(1,4-dihydro-1,4-dioxo-2,3-naphthylene-dithio)bis(4-thiazolecarboxylate).

5. 2,2'-(1,4-dihydro-1,4-dioxo-2,3-naphthylenedithio)-bis(4-methyl-5-thiazolecarboxanilide).

6. Diethyl 2,2'-(1,4-dihydro-1,4-dioxo-2,3-naphthylene-dithio)bis(4-methyl-5-thiazolecarboxylate).

7. 2,2'-(1,4-dihydro-1,4-dioxo-2,3-naphthylenedithio)-bis(4-methyl-5-thiazolemethyl ketone).

8. 2,2'-(1,4-dihydro-1,4-dioxo-2,3-naphthylenedithio)-bis(4-methyl-5-thiazolecarboxamide).

References Cited in the file of this patent
UNITED STATES PATENTS

| 2,616,893 | Newby | Nov. 4, 1952 |
| 2,756,238 | D'Amico | July 24, 1956 |